United States Patent [19]

Akamatsu et al.

[11] Patent Number: 5,036,702
[45] Date of Patent: Aug. 6, 1991

[54] AIR FLOW METER WITH COMPENSATION OF SECOND STAGE DELAY OF THERMAL INERTIA

[75] Inventors: Masuo Akamatsu; Hiroatsu Tokuda; Izumi Watanabe; Hiroshi Yoneda, all of Katsuta, Japan

[73] Assignees: Hitachi, Ltd., Tokyo; Hitachi Automotive Engineering Co., Ltd., Ibaraki, both of Japan

[21] Appl. No.: 247,505

[22] Filed: Sep. 22, 1988

[30] Foreign Application Priority Data

Sep. 30, 1987 [JP] Japan .................................. 62-244096

[51] Int. Cl.⁵ ................................................ G01F 1/68
[52] U.S. Cl. .................................. 73/204.15; 73/204.18
[58] Field of Search ........... 73/204.15, 204.18, 204.26, 73/204.27

[56] References Cited

U.S. PATENT DOCUMENTS 4,297,881  11/1981  Sasayama et al. .
4,311,042   1/1982  Hosoya et al. ................... 73/204.18
4,322,970   9/1982  Peter .
4,400,974   8/1983  Nishimura et al. .............. 73/204.15
4,523,462   6/1985  Kolodjski ......................... 73/204.18
4,562,731   1/1986  Nishimura et al. .
4,715,224  12/1987  Kuhn .

Primary Examiner—Herbert Goldstein
Attorney, Agent, or Firm—Antonelli, Terry, Stout & Kraus

[57] ABSTRACT

A hot wire type air flow meter employing a hot wire temperature dependent resistor having a heat generating portion and a non-heat generating portion comprising a feedback control circuit controlling the hot wire temperature dependent resistor temperature constant which includes a phase shift circuit for inducing a sufficient phase delay in feedback signals thereby compensating a second stage delay in output signals of the air flow meter caused by the thermal inertia of the non-heat generating portion and enhancing response characteristic of the air flow meter.

14 Claims, 4 Drawing Sheets

AIR FLOW METER WITH COMPENSATION OF SECOND STAGE DELAY OF THERMAL INERTIA

The present invention relates to a hot wire type air flow meter for measuring an air flow rate by utilizing the cooling action of an air flow on a heat generating temperature dependent resistor disposed in an air flow passage, and more particularly the invention relates to a hot wire type air flow meter including a heat generating temperature dependent resistor formed of a heat generating portion and a non-heat generating portion supporting the heat generating portion, such as wound type, thin film type and thick film type temperature dependent resistors. The hot wire type air flow meter of the present invention is suitably applicable to the measurement of an intake air flow rate of an automotive internal combustion engine.

BACKGROUND OF THE INVENTION

The heat generating temperature dependent resistor formed of a heat generating portion and a non-heat generating portion supporting the heat generating portion such as wound type, thin film type and thick film type temperature dependent resistors used in the hot wire type air flow meter has two kinds of thermal inertias; one kind of a primary thermal inertia defined by the heat generating portion and causing a first stage delay in air flow rate signals, and the other kind is a secondary thermal inertia defined by the non-heat generating portion and further causing second stage delay in the air flow rate signals in response to flow rate changes during an operation of the hot wire type air flow meter.

The fuel amount of an automotive internal combustion engine is controlled in accordance with detected air flow rate signals from the air flow meter such that delayed or incorrect air flow rate signals during the air flow rate changes cause an improper fuel control for the automotive internal combustion engine.

Since the second stage delay in detected air flow rate signals caused by the thermal inertia of the non-heat generating portion of the hot wire resistor is substantial, and hitherto, many attempts have been made to reduce the thermal inertia of the non-heat generating portion in order to minimize the second stage delay in the air flow rate signals caused during air flow rate changes, for example, as disclosed in U.S. Pat. No. 4,715,224 issued on Dec. 29, 1987. However such attempts caused structural and manufacturing limitations of the hot wire resistors having a non-heat generating portion.

SUMMARY OF THE INVENTION

An object of the present invention is to provide a hot wire type air flow meter using a heat generating temperature dependent resistor including a non-heat generating support member with a sufficient response characteristic during air flow rate changes, by compensating, eliminating or cancelling out a substantial portion of the second stage delay in the detected response signals during air flow rate changes.

The object of the present invention is carried out by incorporating a phase shift circuit into a feedback control circuit which performs a constant temperature control for the heat generating temperature dependent resistor whereby a transfer characteristic of the feedback control circuit is modified to have a predetermined phase delay characteristic sufficient to compensate the second stage delay in the air flow rate signals during air flow rate changes which are detected at the output terminal of the heat generating temperature dependent resistor.

A hot wire type air flow meter of the present invention comprises a heat generating temperature dependent resistor formed of a heat generating member and a non-heat generating member supporting the heat generating member; a switching transistor for controlling current flow to the heat generating temperature dependent resistor; a feedback control circuit for the heat generating temperature dependent resistor, the feedback control circuit including a first operational amplifier which controls the conductivity of the switching transistor for maintaining the heat generating temperature dependent resistor at a predetermined temperature. The feedback control circuit further includes a phase shift circuit which provides the feedback control circuit with a transfer characteristic to phase-delay feedback signals enough to compensate the second stage delay in air flow rate signals caused by the non-heat generating member of the heat generating temperature dependent resistor.

Since a predetermined phase delay is provided for the transfer characteristic of the feedback control circuit in compliance with the second stage delay caused by the secondary thermal inertia of the heat generating temperature dependent resistor, the second stage delay is compensated for, thereby improving the response characteristic as a whole of the hot wire type air flow meter of the present invention when air the flow rate changes.

More particularly, since the phase of the output feedback signal is delayed from that of the input feedback signal applied to the feedback control circuit, when the flow rate changes in an increasing direction, the output feedback signal provides an indication as if the heat generating temperature dependent resistor were overcooled, so that the heating current is rapidly increased, and when the flow rate changes in a decreasing direction, the output feedback signal provides an indication as if the heat generating temperature dependent resistor were over-heated, so that the heating current is rapidly decreased. In other words, the present invention takes advantage of an over-shooting phenomenon to reduce the second stage delay included in the detected response air flow rate signals caused by the thermal inertia of the non-heat generating support member of the heat generating temperature dependent resistor.

DESCRIPTION OF PREFERRED EMBODIMENTS

A hot wire type air flow meter according to the present invention will be explained in detail with reference to the embodiments shown in the accompanying drawings.

Throughout the drawings, the same numeral denotes an equivalent or similar element.

Figure 1:
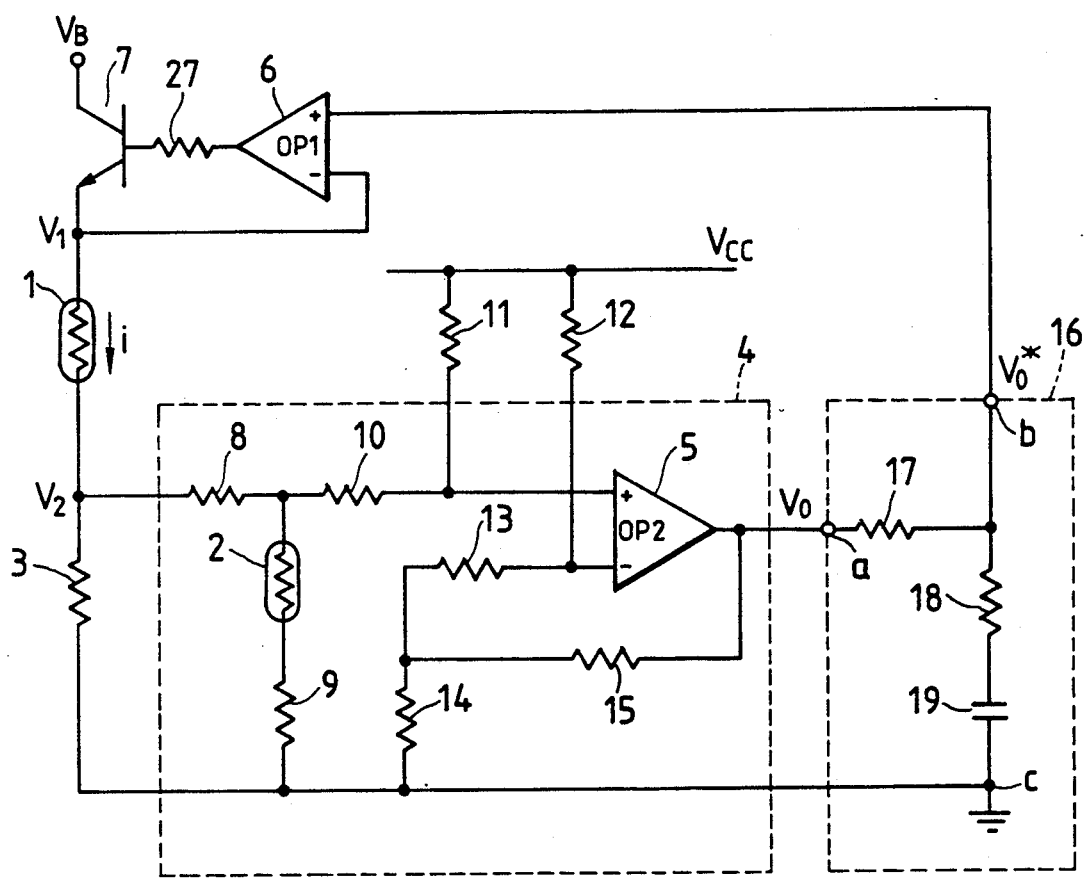
FIG. 1 shows a circuit diagram of a first embodiment of a hot wire type air flow meter according to the present invention.

FIG. 1 shows an embodiment of the present invention. The reference numeral 1 represents a heat generating hot wire temperature dependent resistor, 2 a temperature detecting cold wire temperature dependent resistor, 3 a current detecting resistor, 4 an amplifier, 5 and 6 operational amplifiers, 7 a switching transistor for controlling a current flow to the heat generating resistor 1, 8 to 15 resistors, 16 a phase shifter, 17 and 18 resistors, 19 a capacitor, 27 a base resistor, $V_B$ power source voltage and Vcc reference voltage.

The heat generating resistor 1, for example, may be a wound type resistor comprising a resistance wire are wound around a bobbin, or a thin film type resistor wherein a thin film resistor is formed on a substrate. The resistance of the heat generating resistor 1 changes in accordance with the temperature of the resistor. The heat generating resistor 1 is disposed in a passage of air flow whose rate is to be measured.

The temperature detecting resistor 2 generally has the same structure as the heat generating resistor 1 and is disposed in the air flow passage so as to detect the temperature of the air.

The current detecting resistor 3 detects a current i representing air flow rate to be measured which is supplied to the heat generating resistor 1 as a voltage $V_2$.

The amplifier 4 includes an operational amplifier 5 and amplifies the voltage $V_2$ and outputs the amplified voltage to an operational amplifier 6. The resistors 8 and 9 compensate for the intake air temperature change in combination with the temperature detecting resistor 2, and the resistors 10 to 13 adjust the offset voltage of the operational amplifier 5. The resistors 14 and 15 in combination determine a DC amplification rate of the amplifier circuit 4.

The operational amplifier 6 receives a feedback control signal $V_0$ from the amplifier 4, thereby controlling the transistor 7 so that the voltage $V_1$ produced by the current i which flows through the heat generating resistor 1 is equal to the control signal $V_0$ of the amplifier 4.

The amplifier 4, the operational amplifier 6 and the transistor 7 therefore constitute a feedback control system with respect to the current i of the heat generating resistor 1. That is, the current i is so controlled as to maintain the resistance of the heat generating resistor 1 at a constant value. Thus, the heat generating resistor 1 is so controlled as to be maintained at a constant temperature, so that the voltage $V_2$ represents the air flow rate. More specifically, the heat generating resistor 1, which is heated by the current i, is also cooled by the air which passes through the air flow passage where the heat generating resistor 1 is disposed. As a result, the temperature of the heat generating resistor 1 is in a condition of equilibrium between the amount of heating by the current i and the amount of cooling by the air flow. Consequently, if the current i is so controlled that the temperature of the heat generating resistor 1, namely, the resistance value thereof is at every moment constant, the current i changes in accordance with the air flow rate.

Thus, the air flow rate is detected as a function of the current i.

It is now assumed that no phase shifter 16 is provided, and the output $V_0$ of the amplifier 4 is input to the operational amplifier 6 as it is, as in the prior art.

Figure 2:
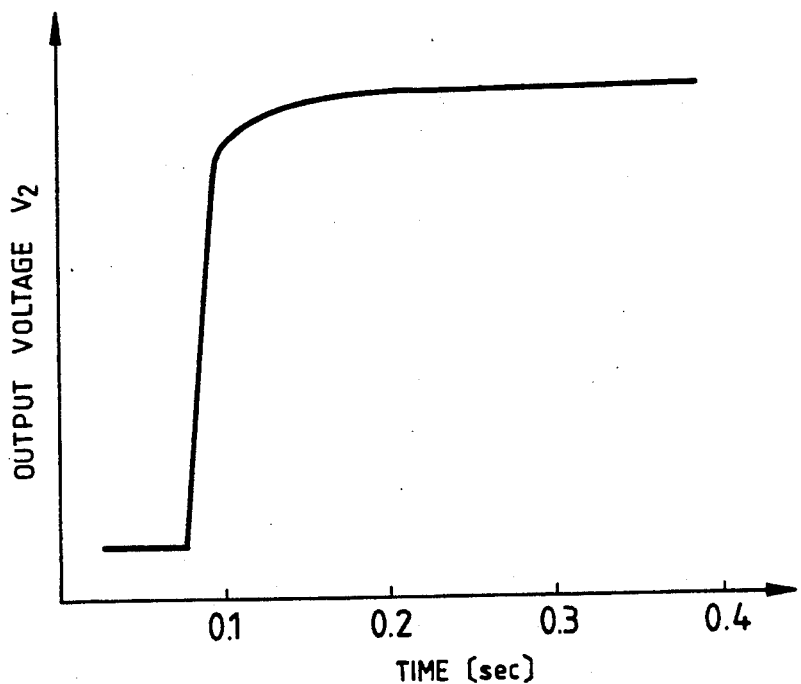
FIG. 2 shows a signal characteristic representing air flow rate during step-wise air flow rate change according to a conventional hot wire type air flow meter.

The output of the air flow meter is obtained as the voltage $V_2$, as described above, but a second stage delay is produced in the output due to the influence of the secondary thermal inertia which exists in the heat generating resistor 1. The response characteristic with respect to the stepped change of the air flow rate is shown in FIG. 2.

The reason for this second stage delay is that when the heat generating resistor 1 has a non-heat generating portion such as a coil bobbin or a substrate, the change in the temperature of the non-heat generating portion is delayed in accordance with the change in the air flow rate with respect to the change in the temperature of the heat generating portion.

In this embodiment, however, the phase shifter 16 is provided in the feedback system leading from the output of the amplifier 4 to the operational amplifier 6, as is seen from FIG. 1. The phase shifter 16 is composed of a first resistor 17, a second resistor 18 and a capacitor 19 which are sequentially connected to each other in series, thereby constituting a series circuit. The voltage $V_0$ is applied between both ends a and c of the entire series circuit as an input, and an output voltage $V_0^*$ is obtained from both ends b and c of the series circuit consisting of the second resistor 18 and the capacitor 19, thereby modifying the transfer characteristics of the feedback control system to cause a sufficient phase delay in feedback signals to compensate for the second stage delay in air flow rate signals.

The phase shifter 16 maintains its output $V_0^*$ at a constant value when the output $V_0$ of the amplifier 4 is constant, but when the output $V_0$ of the amplifier 4 has changed, the phase shifter 16 induces a phase delay for the output $V_0$ with the following time constant T and amount of adjustment l defined by the phase shifter 16 and modifies it as the output $V_0^*$.

$$T = (R_{17} + R_{18}) \cdot C$$

$$l = R_{18}/(R_{17} + R_{18})$$

wherein $R_{17}$ and $R_{18}$ represent resistances of the resistors 17 and 18, respectively, and C represents the capacity of the capacitor 19.

In other words, the gain of the phase shifter 16 is reduced only for high frequency components corresponding to changing signal components other than non-changing DC signal components.

As a result, a predetermined phase delay is provided for the output feedback signal with respect to the current i flowing through the heat generating resistor 1, and the optimum compensation for the secondary thermal inertia of the heat generating resistor 1 is obtained, thereby compensating for the second stage delay in the detecting voltage $V_2$ with respect to a change in the air flow rate.

Figure 3:
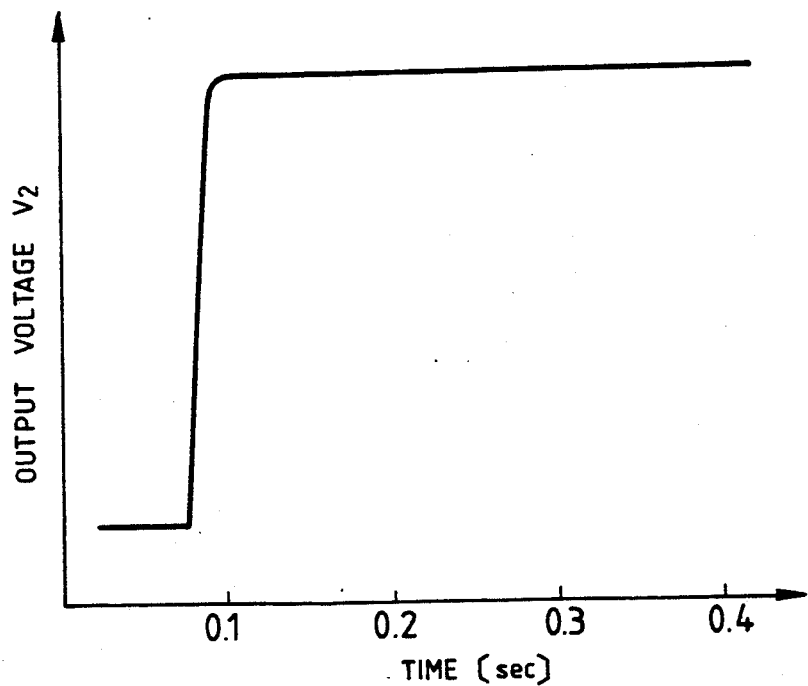
FIG. 3 shows a signal characteristic representing air flow rate during step-wise air flow rate change according to the embodiment of the present invention shown in FIG. 1.

FIG. 3 shows the characteristic of the output voltage $V_2$ exhibited when the stepped change is provided for the air flow rate in the same way as in FIG. 2. As is obvious from FIG. 3, according to the embodiment shown in FIG. 1, it is possible to suppress the second stage delay of the output voltage $V_2$, and to obtain a sufficient responsiveness.

Figure 4:
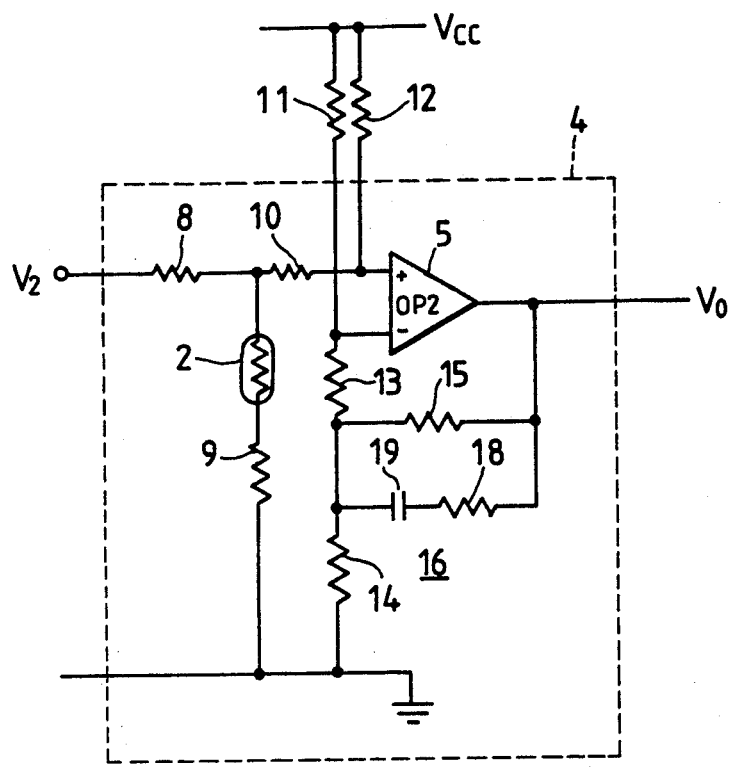
FIG. 4 shows a part of a circuit diagram of a second embodiment of a hot wire type air flow meter according to the present invention.

FIG. 4 shows another embodiment of the present invention, wherein only a portion corresponding to the amplifier 4 shown in FIG. 1 is shown. The phase shifter 16 is applied to the negative feedback circuit of the operational amplifier 5 itself in the amplifier 4. In this embodiment, instead of disposing the phase shifter 16 between the operational amplifiers 5 and 6 as illustrated in FIG. 1.

Figure 5:
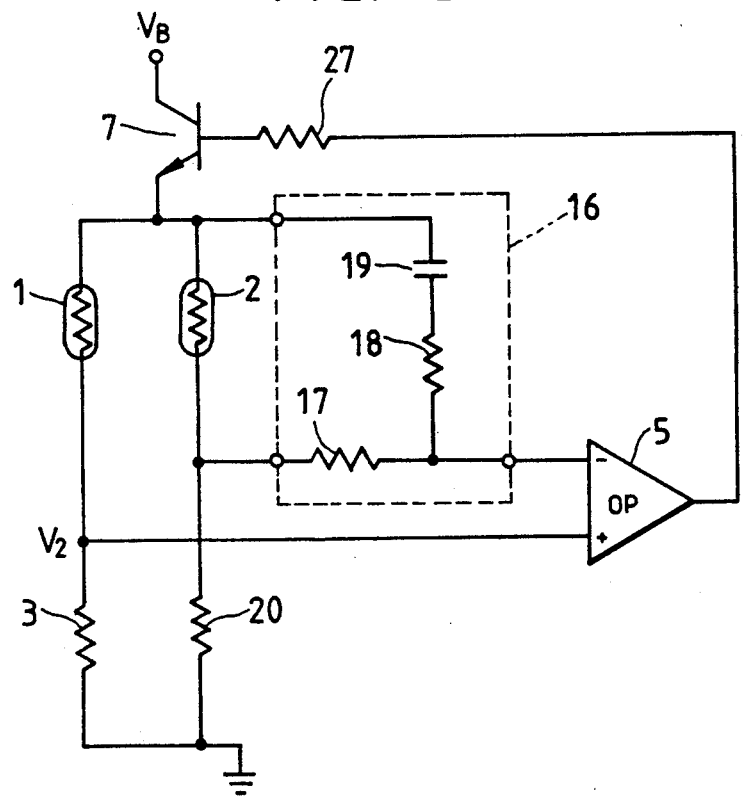
FIG. 5 shows a circuit diagram of a third embodiment of a hot wire type air flow meter according to the present invention.

FIG. 5 shows still another embodiment of the present invention, wherein the heat generating resistor 1 constitutes a bridge circuit together with the temperature detecting resistor 2, the current detecting resistor 3 and a newly added reference resistor 20 and the phase shifter 16 is disposed between the bridge circuit and the operational amplifier 5, so that the equilibrium bridge circuit so controls the heat generating resistor 1 as to be maintained at a constant temperature.

Figure 6:
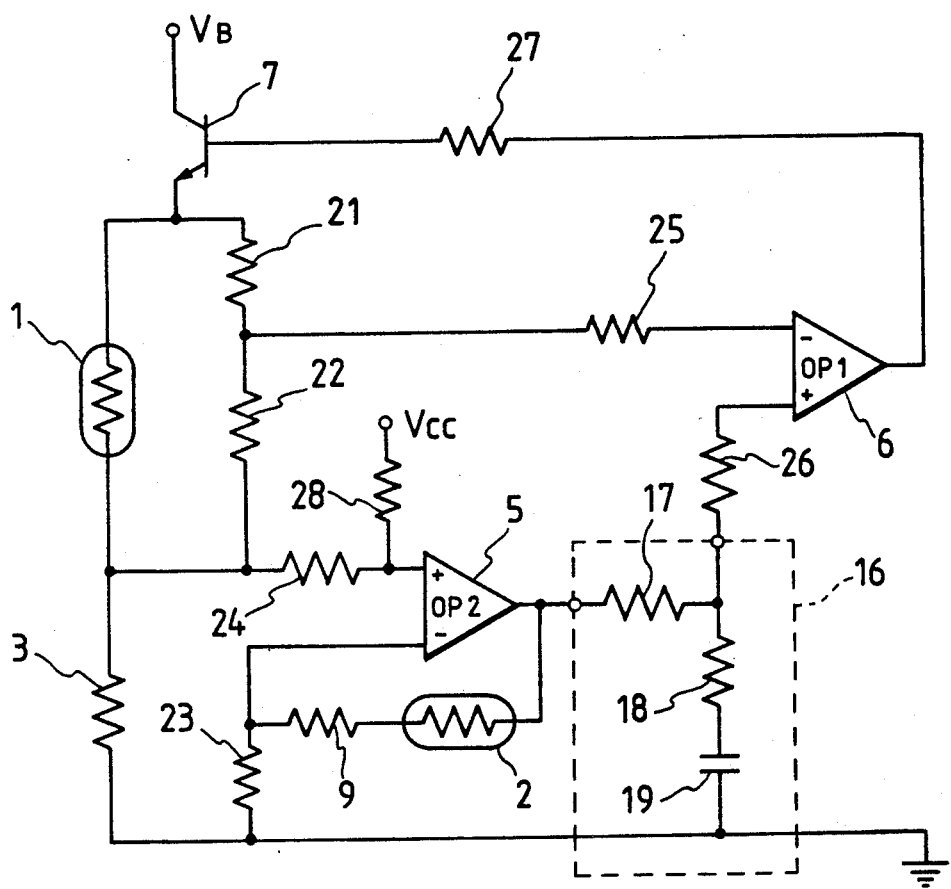
FIG. 6 shows a circuit diagram of a fourth embodiment of a hot wire type air flow meter according to the present invention.

FIG. 6 shows still further embodiment of the present invention similar to that shown in FIG. 1 except that a voltage dividing circuit composed of resistors 21 and 22 is connected in parallel with the heat generating resistor 1 applying the divided voltage to the negative terminal of the operational amplifier 6 and that the temperature detecting resistor 2 is disposed in the negative feedback circuit of the operational amplifier 5, wherein the numeral 23 is a negative feedback resistor for the operational amplifier 5, 24 and 28 resistors for adjusting offset of the operational amplifier 5, and 25 and 26 input resistors for the operational amplifier 6.

In the embodiments shown in FIGS. 4, 5 and 6, the phase shifter 16 is also inserted in the feedback control system of the heat generating resistor 1, and the time constant T and the amount of adjustment l of the phase shifter 16 are properly set, thereby eliminating the second stage delay in the output voltage $V_2$ and providing a sufficient responsiveness.

According to the present invention, since it is possible to compensate for the second stage delay in the output of the hot wire type air flow meter which uses a heat generating resistor having a secondary thermal inertia with respect to the change in the air flow rate, the responsiveness of the output of the air flow meter with respect to the change in the air flow rate is advantageously sufficiently improved.

In addition, the present invention is advantageous in that since the phase compensation is incorporated in the feedback loop for the constant temperature control, the S/N ratio of the output is improved, since the gain of the feedback control circuit with regard to high frequency components corresponding to external disturbances such as electric noise is reduced.

We claim:

1. A hot wire type air flow meter comprising:
   a heat generating temperature dependent resistor formed of a heat generating member and a non-heat generating member supporting the heat generating member;
   a current detecting resistor connected in series with said heat generating temperature dependent resistor;
   a switching transistor for controlling current flow to said heat generating temperature dependent resistor; and
   a feedback control circuit for said heat generating temperature dependent resistor for maintaining the same at a predetermined temperature, said feedback control circuit including a first operational amplifier for amplifying a feedback signal derived from said current detecting resistor, phase shift means for providing said feedback control circuit with a transfer characteristic sufficient to induce a phase delay in said feedback signal caused by a thermal inertia of the non-heat generating member of said heat generating temperature dependent resistor, said phase shift means including a resistor and a capacitor connected in series, and a second operational amplifier which control conductivity of said switching transistor with reference to the phase delayed feedback signal, wherein said shift phase shift means is disposed between said first and second operational amplifiers.

2. An air flow meter according to claim 1 further comprising a voltage dividing circuit connected in parallel with said heat generating temperature dependent resistor, the divided voltage from said voltage dividing circuit being applied to one input terminal of said first operational amplifier and a temperature detecting temperature dependent resistor being arranged in a negative feedback circuit of said second operational amplifier.

3. An air flow meter comprising:
   a heat generating temperature dependent resistor formed of a heat generating member and a non-heat generating member supporting the heat generating member and disposed in an air flow passage;
   a current detecting resistor connected in series with said heat generating temperature dependent resistor;
   a switching transistor for controlling current flow to said heat generating temperature dependent resistor;
   a feedback control circuit for said heat generating temperature dependent resistor, said feedback control circuit including an operational amplifier connected to the series circuit of said heat generating temperature dependent resistor and said current detecting resistor and to said switching transistor, and a phase shift circuit providing said feedback control circuit with a transfer characteristic sufficient to induce a phase delay in feedback signals to compensate a second stage delay in output signals of the air flow meter caused by the a thermal inertia of the non-heat generating member of said heat generating temperature dependent resistor;
   a series circuit including a temperature detecting resistor disposed in the air passage and a reference resistor, said series circuit being connected in parallel with the series circuit including said heat generating temperature dependent resistor and said current detecting resistor to constitute a bridge circuit, and said phase shift circuit being disposed between said bridge circuit and said operational amplifier.

4. An air flow meter comprising:
   a heat generating temperature dependent resistor formed of a heat generating member and a non-heat generating member supporting the heat generating member, the non-heat generating member of said heat generating temperature dependent resistor having a thermal inertia causing a second stage delay in output signals of the air flow meter;
   a current detecting resistor connected in series with said heat generating temperature dependent resistor;
   a switching transistor for controlling current flow to said heat generating temperature dependent resistor; and a feedback control circuit for said heat generating temperature dependent resistor for maintaining the same at a predetermined temperature, said feedback control circuit including phase shift means for providing said feedback control circuit with a transfer characteristic sufficient to induce a phase delay in feedback signals to compensate said second stage delay in output signals of the air flow meter caused by the thermal inertia of the non-heat generating member of said heat generating temperature dependent resistor, wherein said phase shift means is formed of a resistor and a capacitor connected in series.

5. An air flow meter according to claim 4, wherein said feedback control circuit further includes a first operational amplifier which controls conductivity of said switching transistor with reference to the phase delayed feedback signals.

6. An air flow meter according to claim 5 further comprising a second operational amplifier for amplifying the feedback signals.

7. An air flow meter according to claim 6 wherein said phase shift means is disposed in a negative feedback circuit of said second operational amplifier.

8. An air flow meter comprising:
a heat generating temperature dependent resistor formed of a heat generating member and a non-heat generating member supporting the heat generating member;
a current detecting resistor connected in series with said heat generating temperature dependent resistor;
a switching transistor for controlling current flow to said heat generating temperature dependent resistor; and
a feedback control circuit for said heat generating temperature dependent resistor for maintaining the same at a predetermined temperature, said feedback control circuit including phase shift means for providing said feedback control circuit with a transfer characteristic sufficient to induce a phase delay in feedback signals to compensate a delay in output signals of the air flow meter caused by a thermal inertia of the non-heat generating member of said heat generating temperature dependent resistor, wherein said phase shift means is formed of first and second resistors and a capacitor connected in series, of which input terminals are provided at the ends of the entire series circuit and of which output terminals are provided at the ends of a series circuit formed of the second resistor and the capacitor.

9. An air flow meter comprising:
a heat generating temperature dependent resistor disposed in an air flow passage and having portions which exhibit primary and secondary kinds of thermal inertia, respectively;
a current detecting resistor connected in series with said heat generating temperature dependent resistor; and
a feedback control circuit for performing feedback control with respect to the current flowing through said heat generating temperature dependent resistor, including:
(a) a switching transistor for controlling current flow to said heat generating temperature dependent resistor;
(b) a phase shift circuit for providing said feedback control circuit with a transfer characteristic sufficient to induce a phase delay in feedback signals to compensate a second stage delay in output signals of the air flow meter caused by a secondary thermal inertia of said heat generating temperature dependent resistor, said phase shift circuit including a resistor and a capacitor connected in series; and
(c) a first operational amplifier which controls conductivity of said switching transistor with reference to the phase delayed feedback signals.

10. An air flow meter comprising:
a heat generating temperature dependent resistor disposed in an air flow passage;
a current detecting resistor connected in series with said heat generating temperature dependent resistor; and
a feedback control circuit for performing feedback control with respect to current flowing through said heat generating temperature dependent resistor, including:
(a) a switching transistor for controlling current flow to said heat generating temperature dependent resistor;
(b) a phase shift circuit for providing said feedback control circuit with a transfer characteristic sufficient to induce a phase delay in feedback signals to compensate a second stage delay in output signals of the air flow meter caused by a thermal inertia of said heat generating temperature dependent resistor;
(c) an operational amplifier which controls conductivity of said switching transistor with reference to the phase delayed feedback signals; and
(d) a series circuit including a temperature detecting resistor disposed in the air passage and a reference resistor, said series circuit being connected in parallel with the series circuit including said heat generating temperature dependent resistor and said current detecting resistor to constitute a bridge circuit, and said phase shift means being disposed between said bridge circuit and said operational amplifier.

11. An air flow meter comprising:
a heat generating temperature dependent resistor disposed in an air flow passage;
a current detecting resistor connected in series with said heat generating temperature dependent resistor;
a switching transistor for controlling current flow to said heat generating temperature dependent resistor;
a first operational amplifier which controls conductivity of said switching transistor with reference to a phase delayed feedback signal;
a phase shift circuit for providing a transfer characteristic sufficient to induce the phase delay in said feedback signal caused by a thermal inertia of said heat generating temperature dependent resistor, said phase shift circuit including a resistor and a capacitor connected in series; and
a second operational amplifier for amplifying the feedback signal derived from said current detecting resistor, wherein said phase shift circuit is disposed between said first and second operational amplifiers.

12. An air flow meter comprising:

a heat generating temperature dependent resistor having a non-heat generating portion and being disposed in an air flow passage, said resistor having a thermal inertia causing a second stage delay in output signals of the air flow meter resulting from said non-heat generating portion thereof;

a current detecting resistor connected in series with said heat generating temperature dependent resistor;

a switching transistor for controlling current flow to said heat generating temperature dependent resistor; and a feedback control circuit for controlling said switching transistor with respect to the current flowing through said heat generating temperature dependent resistor, said feedback control circuit including a phase shift circuit providing said feedback control circuit with a transfer characteristic sufficient to induce a phase delay in feedback signals to compensate said second stage delay in output signals of the air flow meter caused by the thermal inertia of the non-heat generating portion of said heat generating temperature dependent resistor, wherein said phase shift circuit is formed of a resistor and a capacitor connected in series.

13. An air flow meter comprising:

a heat generating temperature dependent resistor disposed in an air flow passage and having a thermal inertia causing a second stage delay in output signals of the air flow meter;

a current detecting resistor connected in series with said heat generating temperature dependent resistor;

a second series circuit, including a temperature detecting resistor disposed in the air passage and a reference resistor, connected in parallel with said first series circuit to constitute a bridge circuit;

a switching transistor for controlling current flow to said heat generating temperature dependent resistor;

a feedback control circuit for controlling said switching transistor to maintain said heat generating temperature dependent resistor at a predetermined temperature; and a phase shift circuit connected between said bridge circuit and said feedback control circuit and being provided with a transfer characteristic sufficient to induce a phase delay in feedback of signals to said switching transistor to compensate said second stage delay.

14. An air flow meter according to claim 13, wherein said phase shift circuit includes a capacitor and at least one resistor connected in series across said temperature detecting resistor.

* * * * *